US006934721B2

(12) United States Patent
Schein

(10) Patent No.: US 6,934,721 B2
(45) Date of Patent: Aug. 23, 2005

(54) METHOD, SYSTEM, AND PROGRAM FOR MANAGING INFORMATION FOR AN APPLICATION PROGRAM USING A FILE MANAGEMENT SYSTEM

(75) Inventor: Phillip Mark Schein, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 620 days.

(21) Appl. No.: 09/973,889

(22) Filed: Oct. 9, 2001

(65) Prior Publication Data

US 2003/0069901 A1 Apr. 10, 2003

(51) Int. Cl.[7] .......... G06F 17/30
(52) U.S. Cl. .......... 707/200; 707/102
(58) Field of Search .......... 707/201, 8, 102, 707/200, 100, 103 R, 103 Y, 103 Z, 103

(56) References Cited

U.S. PATENT DOCUMENTS

| | | | | | |
|---|---|---|---|---|---|
| 5,008,853 | A | | 4/1991 | Bly et al. | |
| 5,220,657 | A | | 6/1993 | Bly et al. | |
| 5,247,615 | A | | 9/1993 | Mori et al. | |
| 5,293,619 | A | | 3/1994 | Dean | |
| 5,379,374 | A | | 1/1995 | Ishizaki et al. | |
| 5,446,842 | A | | 8/1995 | Schaeffer et al. | |
| 5,515,491 | A | | 5/1996 | Bates et al. | |
| 5,799,320 | A | | 8/1998 | Klug | |
| 5,890,177 | A | | 3/1999 | Moody et al. | |
| 5,893,116 | A | * | 4/1999 | Simmonds et al. | 707/201 |
| 5,966,512 | A | | 10/1999 | Bates et al. | |
| 6,044,387 | A | | 3/2000 | Angiulo et al. | |
| 6,067,551 | A | | 5/2000 | Brown et al. | |
| 6,073,161 | A | | 6/2000 | DeBoskey et al. | |
| 6,088,702 | A | | 7/2000 | Plantz et al. | |
| 6,112,212 | A | * | 8/2000 | Heitler | 715/501.1 |
| 6,128,619 | A | * | 10/2000 | Fogarasi et al. | 707/102 |
| 6,141,660 | A | * | 10/2000 | Bach et al. | 707/103 R |
| 6,182,080 | B1 | * | 1/2001 | Clements | 707/102 |

(Continued)

OTHER PUBLICATIONS

Berners–Lee, T., and D. Connolly. "Hypertext Markup Language– 2.0– Forms". [online], Sep. 22, 1995. [Retrieved on Oct. 5, 2002]. Retrieved from the Internet at <URL: http://www.w3.org/MarkUp/html–spec/html–spec_8.html#SEC8>.

Panagiotis, Christias. "Unix Man Pages: Sum (1B)." [online], Copyright 1999 Man –cgi 2.00. [Retrieved Sep. 3, 2001]. Retrieved from the Internet at <URL: http://www.n-tua.gr/cgi–bin/man–cgi?sum+1B>.

U.S. Appl. No. 09/973,784, filed Oct. 9, 2001, entitled, "Method, System, and Program for Managing Accesses to Data Objects by Multiple User Programs Over a Network", invented by P.M. Schein.

*Primary Examiner*—Greta Robinson
(74) *Attorney, Agent, or Firm*—Barry W. Chapin, Esq.; Chapin & Huang, LLC

(57) ABSTRACT

Provided is a method, system, and program for managing information for an application program. The information includes an information class having a plurality of attributes values. The application program maintains multiple information class instances and wherein each instance includes at least one of the plurality of attribute values. User input is received indicating a plurality of information class instances and for each information class instance at least one attribute value. A main directory is generated for the application program. For each information class instance received from the user, a subdirectory is generated from the main directory for the information class instance and, for each received attribute value for the information class instance, one attribute file is generated providing the at least one attribute value. Each generated attribute file is stored in the subdirectory of the information class instance for which the attribute value is provided.

66 Claims, 15 Drawing Sheets

U.S. PATENT DOCUMENTS 6,519,612 B1 * 2/2003 Howard et al. ............. 707/200
6,594,675 B1 * 7/2003 Schneider ................... 707/200
6,671,701 B1 * 12/2003 Chouinard .................. 707/201

* cited by examiner

| Task Area (Click on Task Name to Edit) | Task On Time | % Done | Bugs Filed | Comments |
|---|---|---|---|---|
| Entrance Criteria Met | On schedule | 33 | 3 | On time, bob is handling |
| Systems and Hardware setup | behind schedule | 5 | 1 | Late start |
| Fault Injection testing | Not started | 0 | 0 | 0 |
| | | | | |

| Task Area (Click on Task Name to Edit) | Task On Time | % Done Subtask 1 | | | % Done Subtask 2 | | | Bugs Filed | Comments |
|---|---|---|---|---|---|---|---|---|---|
| | | A | B | C | 1 | 2 | 3 | | |
| Entrance Criteria Met | On schedule | 35 | 35 | 0 | 0 | 16 | 2 | 3 | On time, bob is handling |
| Systems and Hardware setup | behind schedule | 5 | 5 | 5 | 26 | 45 | 0 | 1 | Late start |
| Fault Injection testing | Not started | 0 | 0 | 0 | 0 | 0 | 0 | 0 | 0 |
| | | | | | | | | | |

FIG. 12

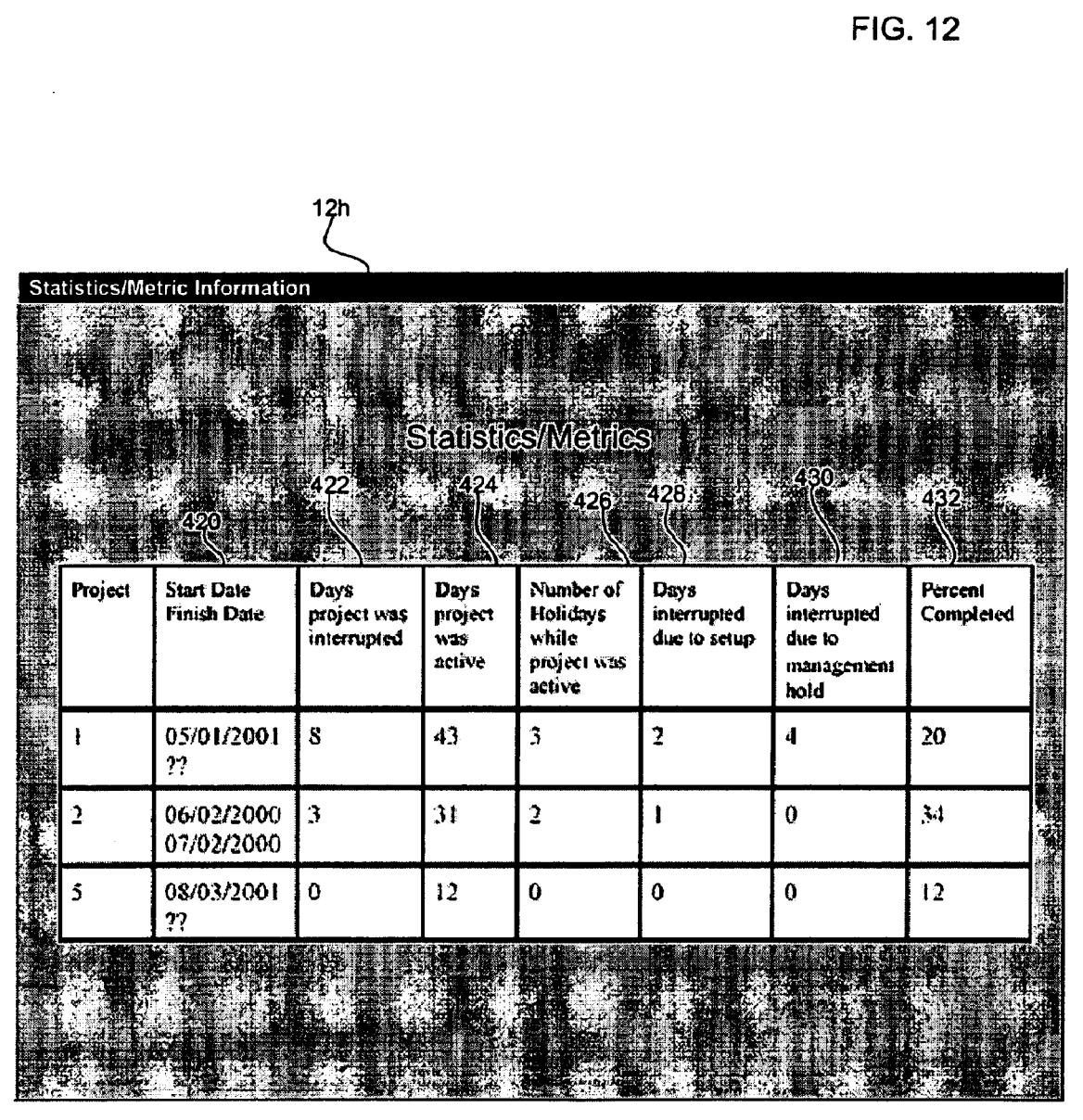

Statistics/Metric Information

Statistics/Metrics

| Project | Start Date<br>Finish Date | Days project was interrupted | Days project was active | Number of Holidays while project was active | Days interrupted due to setup | Days interrupted due to management hold | Percent Completed |
|---|---|---|---|---|---|---|---|
| 1 | 05/01/2001<br>?? | 8 | 43 | 3 | 2 | 4 | 20 |
| 2 | 06/02/2000<br>07/02/2000 | 3 | 31 | 2 | 1 | 0 | 34 |
| 5 | 08/03/2001<br>?? | 0 | 12 | 0 | 0 | 0 | 12 |

METHOD, SYSTEM, AND PROGRAM FOR MANAGING INFORMATION FOR AN APPLICATION PROGRAM USING A FILE MANAGEMENT SYSTEM

BACKGROUND OF THE INVENTION

1. Field of the Invention

The present invention relates to a method, system, and program for managing information for an application program using a file management system.

2. Description of the Related Art

Information management programs, such as e-mail programs, calendaring programs, project management programs, accounting programs, etc., provide users with different views of information through a graphical user interface (GUI). Each window view may include numerous different fields of variable information. The views may also include user interactive elements, such as graphical buttons, hypertext links, etc., that allow the user to interact with the application program to modify information, access further views of information, etc. Many such information management programs maintain the data for the fields in a relational database program comprised of records of columns of data. Such application programs require interaction with a separate database program or incorporate a database program within the application. Typically, the application must utilize an Application Programming Interface (API) to communicate with the external or embedded database program, such as the Open Database Connectivity (ODBC) protocol. Although there are many advantages databases offer for organizing data, embedding a database within a program or requiring an interface to another database program increases both the complexity and cost of the application.

Other prior art applications may store application data in a single file that can be accessed by the application as needed. Although information management programs that store data in a single large file, such as an ASCII delimited file, may avoid the complications experienced using a database program for data management, using a single large file to store all the application data will likely prevent multiple users from concurrently accessing the data file, thereby limiting such information management programs that store data in a single data file to single user applications. Database programs implementing a client/server architecture, on the other hand, permit multiple users to concurrently access data in the database, yet require additional programming complexity and cost to incorporate the database program with the application.

Thus, there is a need in the art for an alternative data management architecture for storing data used by information management programs in a multi-user environment.

SUMMARY OF THE PREFERRED EMBODIMENTS

Provided is a method, system, and program for managing information for an application program. The information includes an information class having a plurality of attributes values. The application program maintains multiple information class instances, wherein each instance includes at least one of the plurality of attribute values. User input is received indicating a plurality of information class instances and for each information class instance at least one attribute value. A main directory is generated for the application program. For each information class instance received from the user, a subdirectory is generated from the main directory for the information class instance and, for each received attribute value for the information class instance, one attribute file is generated providing at least one attribute value. Each generated attribute file is stored in the subdirectory of the information class instance for which the attribute value is provided.

In further implementations, a request for information is received on at least one requested attribute value for the information class instances. In response to the request for information, for each information class instance, the subdirectory for the information class instance is accessed and a determination is made as to whether the accessed subdirectory includes each requested attribute value in one attribute file in the subdirectory. If the subdirectory includes each requested attribute value in one attribute file, then each requested attribute value from the attribute file is returned.

Further provided is a method, system, and program for managing information on a plurality of projects, wherein each project is capable of having a plurality of attribute values. User input is received on a plurality of projects and for each project at least one attribute value. A main directory is generated and for each project for which user input is received, a subdirectory is generated from the main directory for the project and, for each received attribute value, one attribute file is generated providing the at least one attribute value.

Still further, the attribute values for each project are capable of comprising project comments, a project manager, projected completion date, project purpose, project start date, project completion date, project status, project holidays, and project interrupts.

Additionally, a request for information may be received on at least one requested attribute value for the projects. In response to the request for information, each project subdirectory is accessed and a determination made as to whether the accessed project subdirectory includes each requested attribute value in one attribute file in the subdirectory. If the subdirectory includes each requested attribute value in one attribute file, then each requested attribute value is returned from the attribute file.

BRIEF DESCRIPTION OF THE DRAWINGS

Referring now to the drawings in which like reference numbers represents corresponding parts throughout:

FIG. 12 illustrates a GUI panel displaying statistical information on the data in the file management architecture of FIGS. 3*a, b* in accordance with certain implementations of the invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
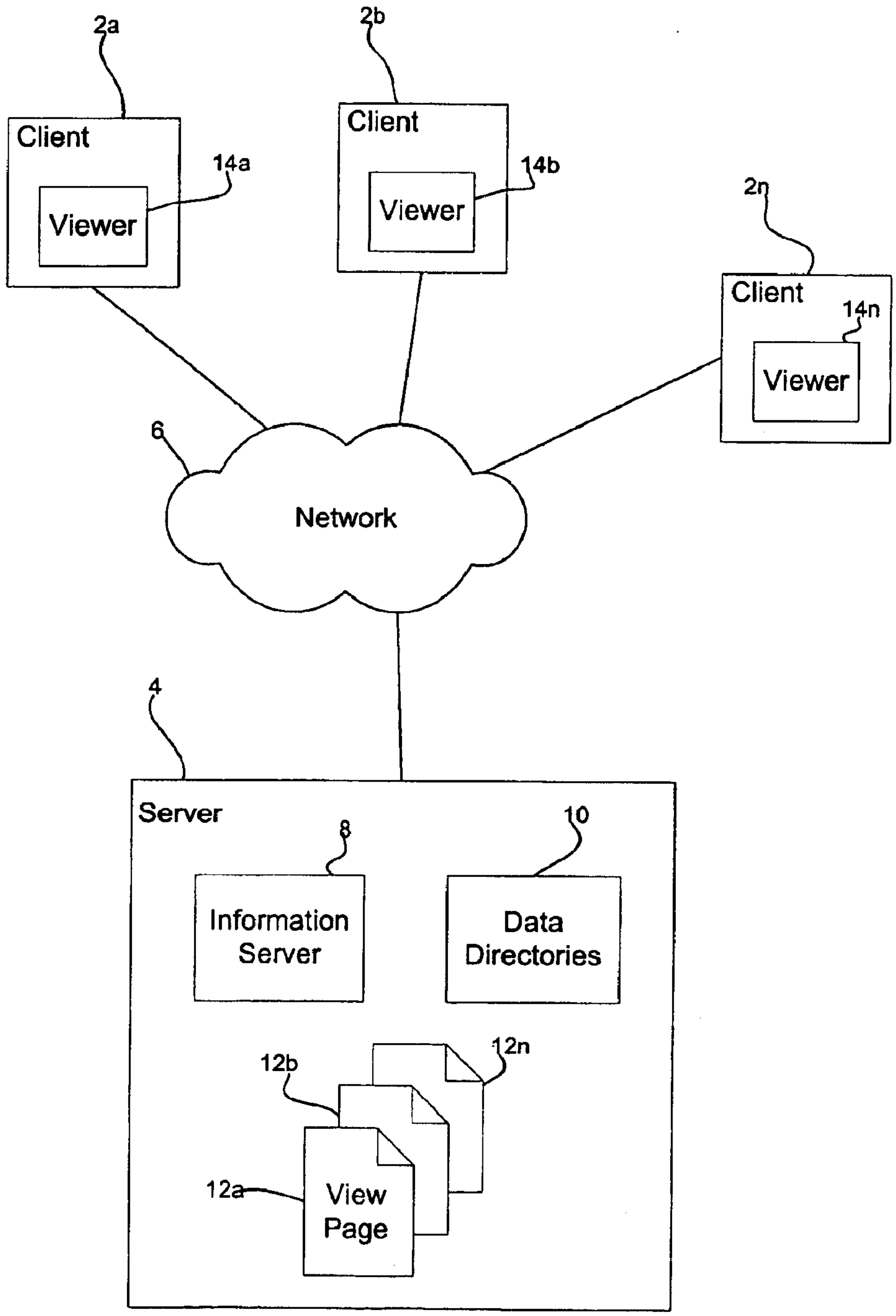
FIG. 1 illustrates a network computing environment in which aspects of the invention are implemented.

FIG. 1 illustrates a network computing environment in which aspects of the invention are implemented. A plurality of client computers 2*a, b . . . n* and a server computer 4 communicate over a network 6, such as a Local Area Network (LAN), Wide Area Network (WAN), the Internet, an Intranet, etc., using a network protocol known in the art, e.g., Ethernet, Fibre Channel, TCP/IP, HyperText Transfer Protocol (HTTP), File Transfer Protocol (FTP), etc. The server 4 includes an information server 8 program that provides access to data maintained in a data directories 10. The information server 8 would access data from the data directories 10 and insert the data into view pages 12*a, b . . . n* that provide a predefined view of the data in the data directories 10. For instance, if the information server 8 implements an e-mail program, then one view 12*a, b . . . n* may comprise all the messages in an "inbox"; if an accounting program, then the view pages 12*a, b . . . n* may provide a view of financial information; if a project management program, then the view pages 12*a, b . . . n* may provide information on projects being monitored, etc. The clients 2*a, b . . . n* further include viewer programs 14*a, b . . . n*, which may comprise any type of program capable of viewing documents known in the art, such as an HTML web browser, word processing program, or any document management program known in the art to render pages of data and enable the user to interact with the server through the graphical elements and data entry fields in the displayed page. In HTML implementations, a user may use the viewer 14*a, b . . . n* to request information from another view page 12*a, b . . . n* by selecting a hypertext link on the current displayed page 12*a, b . . . n* to access another view page 12*a, b . . . n* of further information in the data directories 10.

In certain implementations, the view pages 12*a, b . . . n* may comprise HTML or Extensible Markup Language (XML) pages including hypertext links to other view pages 12*a, b . . . n*. Additionally, the view pages 12*a, b . . . n* may be implemented in alternative multi-media formats, such as Joint Photographic Experts Group (JPEG), the Adobe Portable Document Format (PDF), PostScript, tagged image file format (TIFF), etc. In such case the viewer 14*a, b . . . n* would include the capability to render such alternative view page 12*a, b . . . n* media format. In response to a request from one viewer 14*a, b . . . n* for a particular view at a universe resource locator (URL) address, the information server 8 would access the data designated to be inserted into the requested view page 12*a, b . . . n* from the data directories 10 in the manner described below and insert the accessed into the designated field in the view page 12*a, b . . . n*. The information server 8 would then return the filled-in view page 12*a, b . . . n* to the requesting client 2*a, b . . . n*.

The clients 2*a, b . . . n* include viewer programs 14*a, b . . . n*, such as an HTML browser capable of downloading and rendering a page 12*a, b . . . n* of content from the server 4 using a network transfer protocol, such as HTTP, etc. The clients 2*a, b . . . n* may comprise any computing device known in the art, such as a personal computer, workstation, laptop computer, hand held computer, telephony device, mainframe, server, etc. The server 4 comprises a server-class machine or any other type of computing device capable of responding to data requests from the clients 2*a, b . . . n*.

In certain implementations, the data directories 10 store user data across a plurality of files. For instance, a type of data maintained by the information manager 8 may be categorized as part of an information class, e.g., a project for which information is maintained in a project manager program; a type of e-mail box in an e-mail program; a category of accounting information (e.g., expense, income, equity, etc.). Each instance of the class would include related information, such as attribute values of the general class, where the attribute values may differ among the information class instances.

Figure 2:
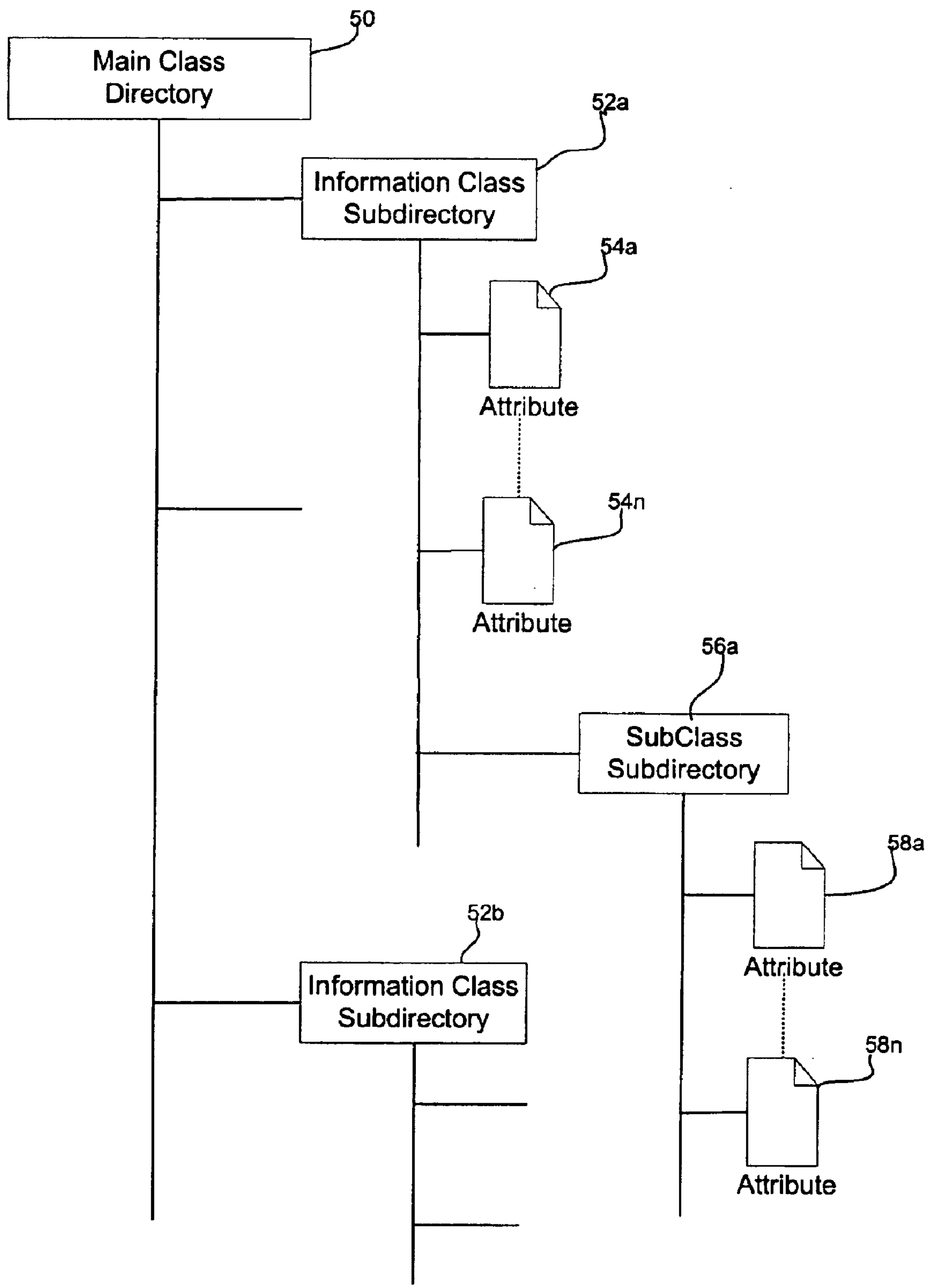
FIG. 2 illustrates a diagram of the file management architecture in accordance with certain implementations of the invention.

FIG. 2 illustrates an arrangement of the data directories 10 where the data managed by the information server 8 comprises an information class having a main class directory 50. A subdirectory 52*a . . . n* is provided for each instance of the information class, e.g., project, e-mail box, etc. The subdirectory 52*a . . . n* includes attribute files 54*a . . . n* that include the values for the attributes of the instance of the information class. Thus, the attributes of a class instance are stored in the attribute file 54*a . . . n* provided for the attribute. The attribute data may be embedded in the attribute file name 54*a . . . n* or stored within the attribute file. Each class instance further includes a subclass. A subclass subdirectory 56*a . . . n* is generated for each information class instance 52*a . . . n*. The subclass 56*a* includes attribute files 58*a . . . n* that provide the attribute values for the subclass. Each information class may include multiple subclasses, although only one is shown in FIG. 2. In this way, all the data that the information server 8 makes available to requesting clients 2*a, b . . . n* is dispersed through separate attribute files that are organized into subdirectories based on the class or subclass of information to which they are associated.

For instance, the general class directory 50 may comprise a calendar and each calendar instance may comprise a day, such that each subdirectory 52 is an instance of one day; the class may comprise an e-mail message for a particular e-mail box and the instance would comprise the type of e-mail box, e.g., send, drafts, inbox, delete, etc.

In one implementation, the information server 8 comprises a project manager. One general class would comprise a project class, and each instance provides information on a particular project. There would be a separate subdirectory for each project instance. Following are some examples of attribute files that provide the attribute values for each project class instance. The following names comprise the file extensions used for the attribute files.

.comments: provides user entered comments for one project.

.mgr: provides the name of the project manager, name can be embedded in the file name, e.g., "jonsmith.mgr"

.profinishda, .profinishmo, .profinishyr: Indicates the projected finish or completion date.

.projname: the name of the project.

.projtype: indicates the type of project.

.purpose: identifies the purpose of the object.

.restrict: limits access to the information that is displayed unless a password is provided.

.startda, .startmo, .startyr: each file provides an attribute of the start date day, month, and year. If the start date is less than or equal to the current date, then the project is active or completed, otherwise, the project is a future project.

.status: contains the status of the project, which may be represented as a certain color or a combination of coloring and text.

.bugtraqs: indicates the number of bugs reported.

.done: indicates the percent of the project that has completed.

.finishda, .finishmo, .finishyr: each file provides an attribute of the finish day, month, and year of the project.

.holddays: number of days project put on hold.

.holidays: number of days holidays that occurred during projects.

.interrupts: a file including information on each interrupt to the project.

Figure 3A:
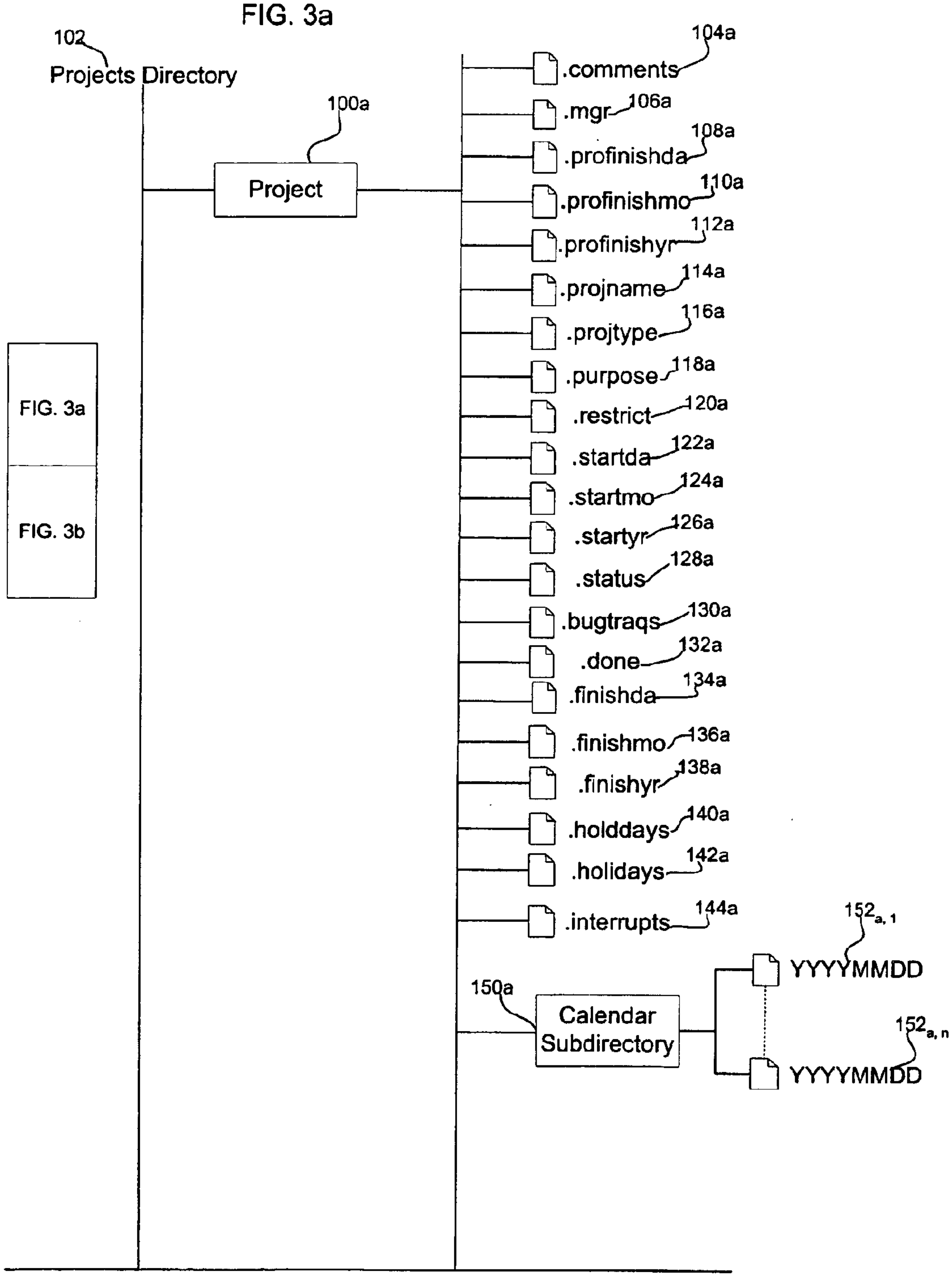
FIGS. 3*a* and 3*b* illustrate a file management architecture used with a project management program in accordance with certain implementations of the invention.

FIGS. 3*a, b* illustrate an implementation of the architecture of the data directories 10 (FIG. 1) when the information server 8 implements a project manager. Each of the above described files are maintained in a project subdirectory 100*a* . . . *n* for a project instance. The project subdirectories 100*a,* for one software project, includes the above mentioned attribute files 104*a*, 106*a* . . . 144*a*. Additional project instances, e.g., 100*b,* would also include the same attribute files 104*b* . . . . 144*b,* but are capable of having different attribute values. Each project instance subdirectory 100*a, b* . . . *n* further includes a calendar subdirectory 150*a, b* . . . *n*. The calendar subdirectory 150*a, b* . . . *n* includes a file $\mathbf{152}_{a,1}$ . . . $\mathbf{152}_{a,n}$ for each of the n days for which there is project information to display in the project calendar. The files $\mathbf{152}_{a,1}$ . . . $\mathbf{152}_{a,n}$ for the days have a name that designates the year, month, and day (YYYYMMDD) of the day for which the file provides data. The day files $\mathbf{152}_{a,1}$ . . . $\mathbf{152}_{a,n}$ may include images, hypertext links, text, etc.

Further provided is a details subdirectory 154*a, b* . . . *n* (FIG. 3*b*) providing information on tasks associated with a project directory 100*a, b* . . . *n* in which the particular details subdirectory 154*a, b* . . . *n* is included. The details subdirectory 154*a, b* . . . *n* includes one or more task subdirectories $\mathbf{156}_{a,1}$ . . . $\mathbf{156}_{a,n}$ for each task defined for a project 100*a* . . . *n*. Each task subdirectory $\mathbf{156}_{a,1}$ . . . $\mathbf{156}_{a,n}$ includes a plurality of attribute files providing attribute information on the task, including a status file, e.g. 158*a*, providing information on the current status of the task, such as on-time, late, delayed, quality, etc.; a .done file, e.g. 160*a*, indicating the percentage completed of the task; and a .numbugs file, e.g. 162*a*, indicating a number of bugs reported for the particular task. In this way, a user may further divide a project into particular tasks for which information may be maintained and presented, thereby further segmenting and providing a lower level of detail of information on the project.

Additional project instance subclass directories 100*b* . . . *n* (shown in FIG. 3*b*) may also be included, having the project attribute files 104*b* . . . 144*b*, . . . , 104*n* . . . 144*n*, calendar subdirectory 150*b* . . . *n*, and day files $\mathbf{152}_{b,1}$ . . . $\mathbf{152}_{b,n}$, . . . , $\mathbf{152}_{n,1}$ . . . $\mathbf{152}_{n,n}$. As discussed, the attribute values may be implemented as data within the file or as data within the file name, followed by the file extension names described above. In this way, each discrete type of information that may be provided for an instance of a class type, e.g., project name, is implemented as a separate file.

Figure 4:
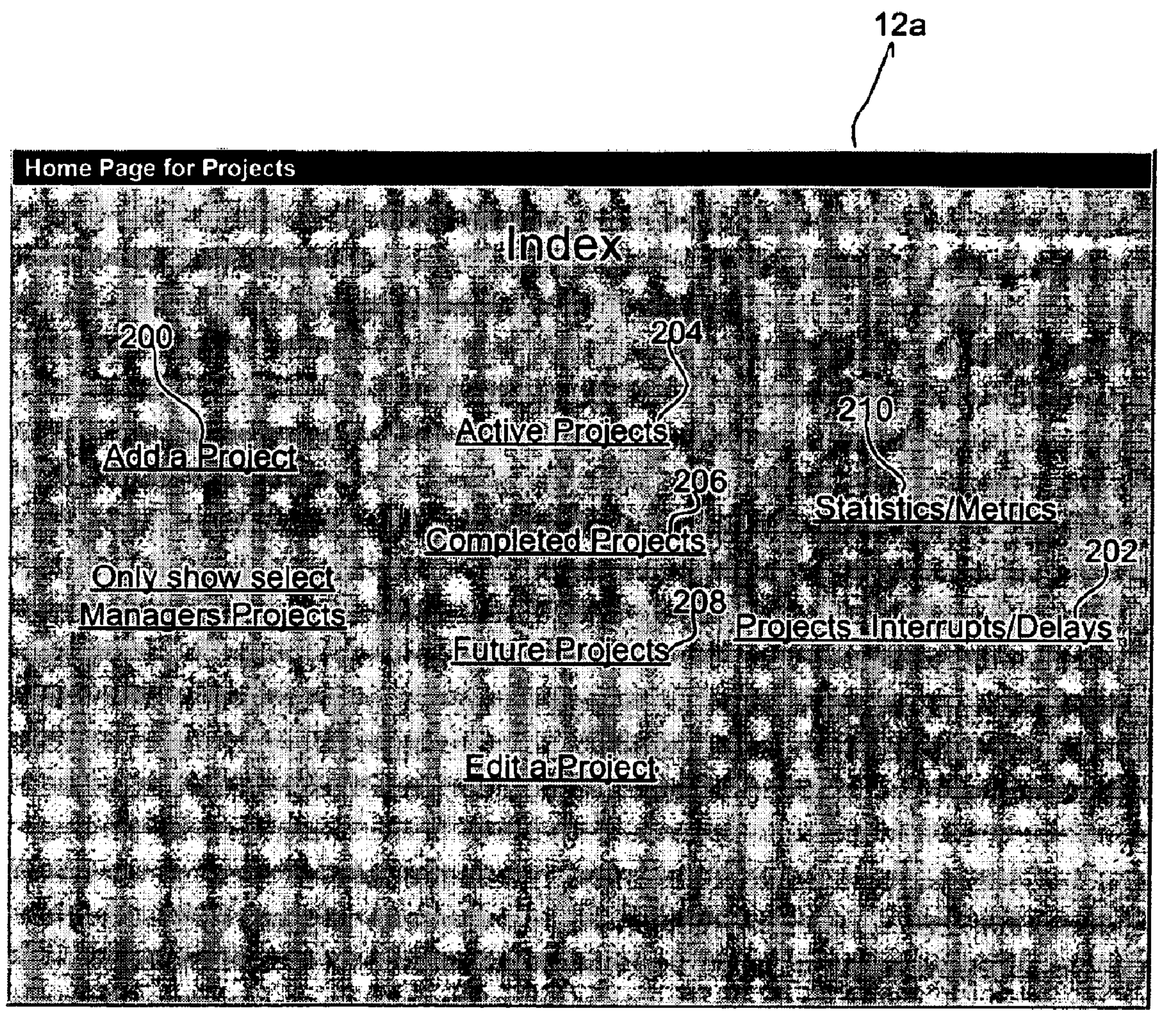
FIG. 4 illustrates a graphical user interface (GUI) panel to provide access to views of the data stored in the file management architecture of FIGS. 3*a, b* in accordance with certain implementations of the invention.

The information server 8 would receive requests from the viewers 14*a, b* . . . *n* for a view page 12*a, b* . . . *n* providing access to project data in the data directories 10 or a page that includes fields in which the user may enter data for a project that will be stored in subdirectories and files of the data directories 10. FIG. 4 illustrates a home view page 12*a* that the information server 8 would initially transmit to a client 2*a, b* . . . *n* that provides access through hypertext links to other of the view pages 12*b* . . . *n*. A client selection of the "Add a Project" link 200 would cause the information server 8 to return a page to the client 2*a, b* . . . *n* including fields in which the client can enter attributes of a new project, where each entered attribute would be stored in one attribute file 104*a* . . . 144*a*.

To return a view page 12*b* . . . *n* including project data from the data directories 10, the information server 8 would access the data in the subdirectory files in a predefined manner to access particular information to insert into a user requested view 12*b* . . . *n* to return to render in the client viewer 14*a, b* . . . *n*.

Figure 5:
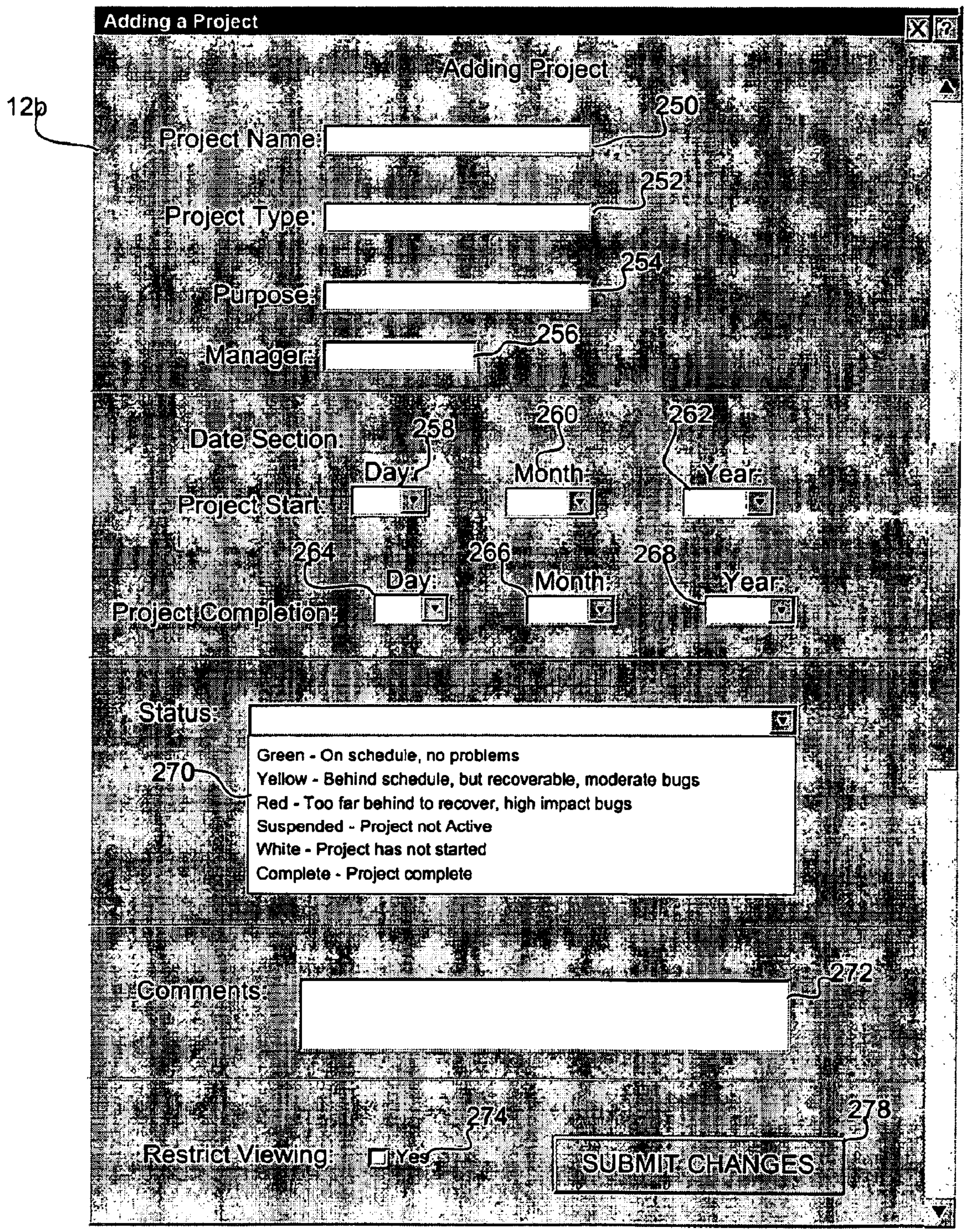
FIG. 5 illustrates a GUI panel in which the user enters project data into the file management architecture of FIGS. 3*a, b* in accordance with certain implementations of the invention.

FIG. 5 illustrates a blank add project page 12*b* the information server 8 would transmit to the client 2*a, b* . . . *n* in response to selection of the "Add a Project" link 200. This page 12*b* includes fields in which the user enters attribute value data for the project. Each entry field in the page 12*b* (FIG. 5) corresponds to one of the attribute files (FIG. 3*a*) as follows: project name entry field 250 corresponds to .projname 114*a* file; project type entry field 252 corresponds to .projtype file 116*a*; purpose entry field 254 corresponds to the .purpose file 118*a*; the manager entry field 256 corresponds to the .mgr file 106*a*; the project start entry fields 258, 260, and 262 corresponds to fields 122*a*, 124*a*, 126*a*; project completion entry fields 264, 266, and 268 corresponds to 134*a*, 136*a*, and 138*a* files; the status entry field 270 corresponds to the .status file 128*a*; the comments entry field 272 corresponds to the .comments 104*a*; the restrict viewing check box 274 corresponds to the .restrict file 120*a*, etc.

The user at the client 2*a, b* . . . *n* would select the submit changes button 278 displayed on the page 12*b* in their viewer program 14*a, b* . . . *n* to transmit the page 12*b* including data entered in one or more of the entry fields 250–274. In response to receiving the page, the information server 8 would then create a new subdirectory $\mathbf{100}_{n+1}$ for the new project. For each entry field in which data is entered, the information server 8 would create the file corresponding to such data entry field and then implement the attribute value entered in the entry field 250–274 in the created files $104_{n+1}$ . . . $144_{n+1}$, where the added project comprises the (n+1)th project for which information is maintained in the projects directory 102. The information server 8 would further generate a calendar subdirectory for the new project subdirectory and add a day file for the day the project was created. Moreover, a details subdirectory for the new project subdirectoy would also be added. In this way, all the subdirectories and accompanying files are created for the project subdirectory being created. Additionally, there can be additional fields in the add project page 12*b* for additional attributes and information which may be maintained in additional files in the project subdirectory.

Selection of the "Projects Interrupts/Delays" hypertext link 202 in the home page 12*a* (FIG. 4) would display all interrupts/delays and a link to a page (not shown) through which the user can enter information on an interrupt to a project. The entry fields on the add interrupt entry page would allow for entry of data in fields for the following interrupt attributes.

Type of Delay: one of a set of predefined types of delays, such as development delay (waiting on baselines, delays caused by an external group, etc.), management hold (number of days management put project on hold), setup (number of days required to setup lab equipment, including setup time after an interruption/delay), holidays, vacation, etc.

Date: the date the interruption began.

Duration: the duration in days of the interruption.

Comments: brief user comments providing further information on the contents.

In certain implementations, all the above information would be maintained in the interrupts file 144*a, b* . . . *n* for each interrupt to the project associated with the subdirectory 100*a, b* . . . *n* including the interrupts file 144*a, b* . . . *n*. The .interrupt file 144*a, b* . . . *n* would include, for each interrupt, each of the above attributes (type of delay, date, duration, and comments). In this way, the attribute file interrupts 144*a, b* . . . *n* has an attribute that has multiple components and would include multiple instances of the components, one instance for each defined interrupt. The multiple components of the interrupt include the interrupt attributes, such as type of delay, date, duration, etc. Thus, certain of the attribute files may include only one value, e.g., the start month, or may include multiple instances, such as multiple interrupts. Further, each attribute value instance in the attribute file may itself be comprised of multiple components or sub-attribute values.

Figure 6:
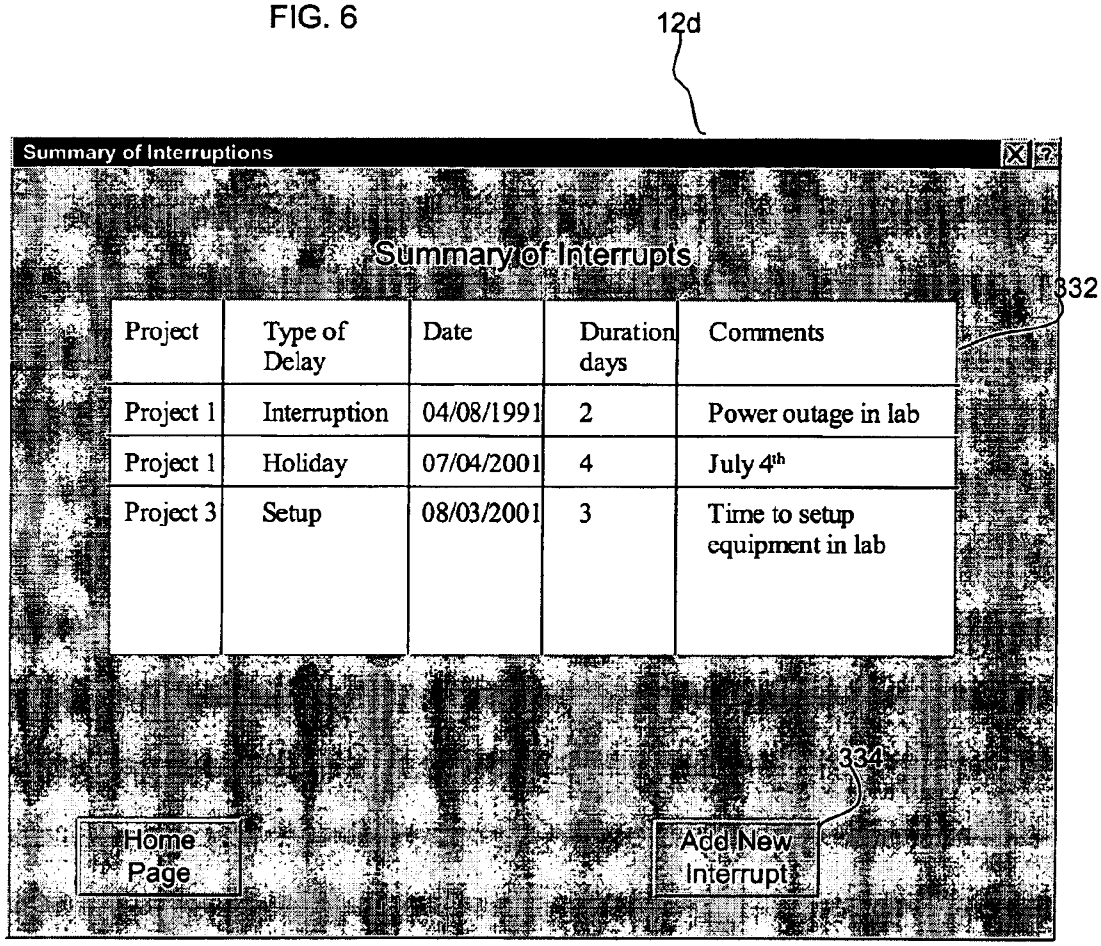
FIG. 6 illustrates a GUI panel displaying project related interrupt information the file management architecture of FIGS. 3*a, b* in accordance with certain implementations of the invention.
Figure 7:
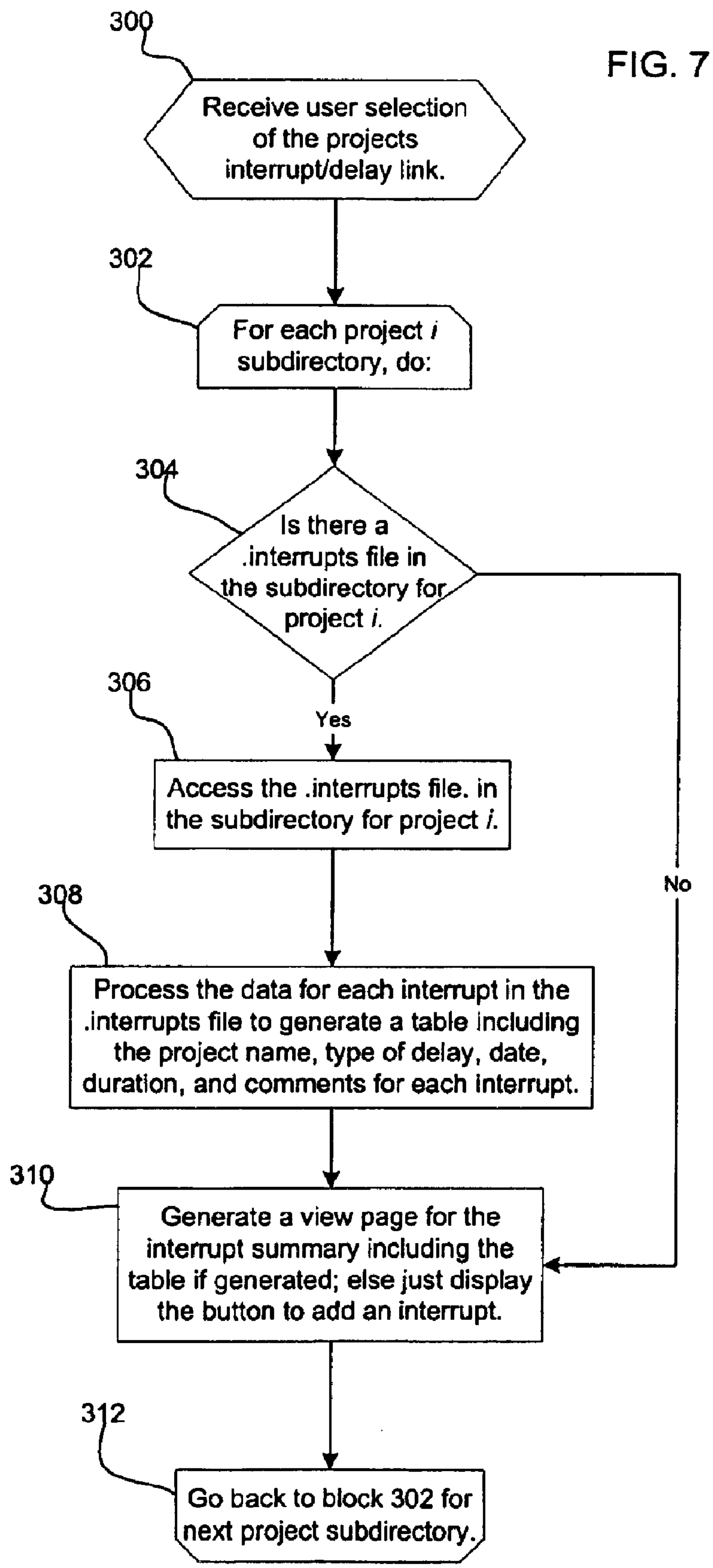
FIG. 7 illustrates logic to generate interrupt information in the file management architecture of FIGS. 3*a, b* in accordance with certain implementations of the invention.

FIG. 6 illustrates an example of the view page 12*d* that the information server 8 would generate to include information on interrupts. The page 12*d* may also allow the user to sort interrupts by date, project, type of delay, etc., and sum up interrupt days by month, year, and total. FIG. 7 illustrates logic implemented in the information server 8 to generate the view page 12*d* shown in FIG. 6. Control begins at block 300 where information sever 8 receives user selection of the projects interrupts/delays link 202 (FIG. 4). A loop is then performed at blocks 302 through 312 for each project subdirectory 100*a, b* . . . *n* in the projects directory 102 (FIGS. 3*a, b* ). If (at block 304) there is an .interrupts file 144*a, b* . . . *n* in the subdirectory i, then the information server 8 accesses (at block 306) the .interrupts file 144*a, b* . . . *n*. The information server 8 then generates (at block 308) a table including a row for each project for which interrupt information is provided in the accessed .interrupts file 144*a, b* . . . *n*, including the information on the project name, type of delay, date, duration days, and comments. In this way, the summary view 12*d* of FIG. 6 may have multiple rows of interrupts for a project if the project has experienced multiple interrupts, with monthly subtotals and complete totals.

The information server 8 then accesses the interrupt summary page template and generates a page 12*d* including, but not limited to, the generated table 332. FIG. 6 illustrates the generated page 300 for the interrupt selection including the table 332 and an add new interrupt button 334 which would return page 12*c* (not shown) including entry fields for the user to enter interrupt information. The add new interrupt 334 may be displayed on other view pages. The user would enter the interrupt information through their view program GUI 14*a, b* . . . *n* and then submit the page to the information server 8 to add a new project interrupt delay to an .interrupt file for the project, or create a new .interrupt file for the project if one does not exist.

Figure 8A:
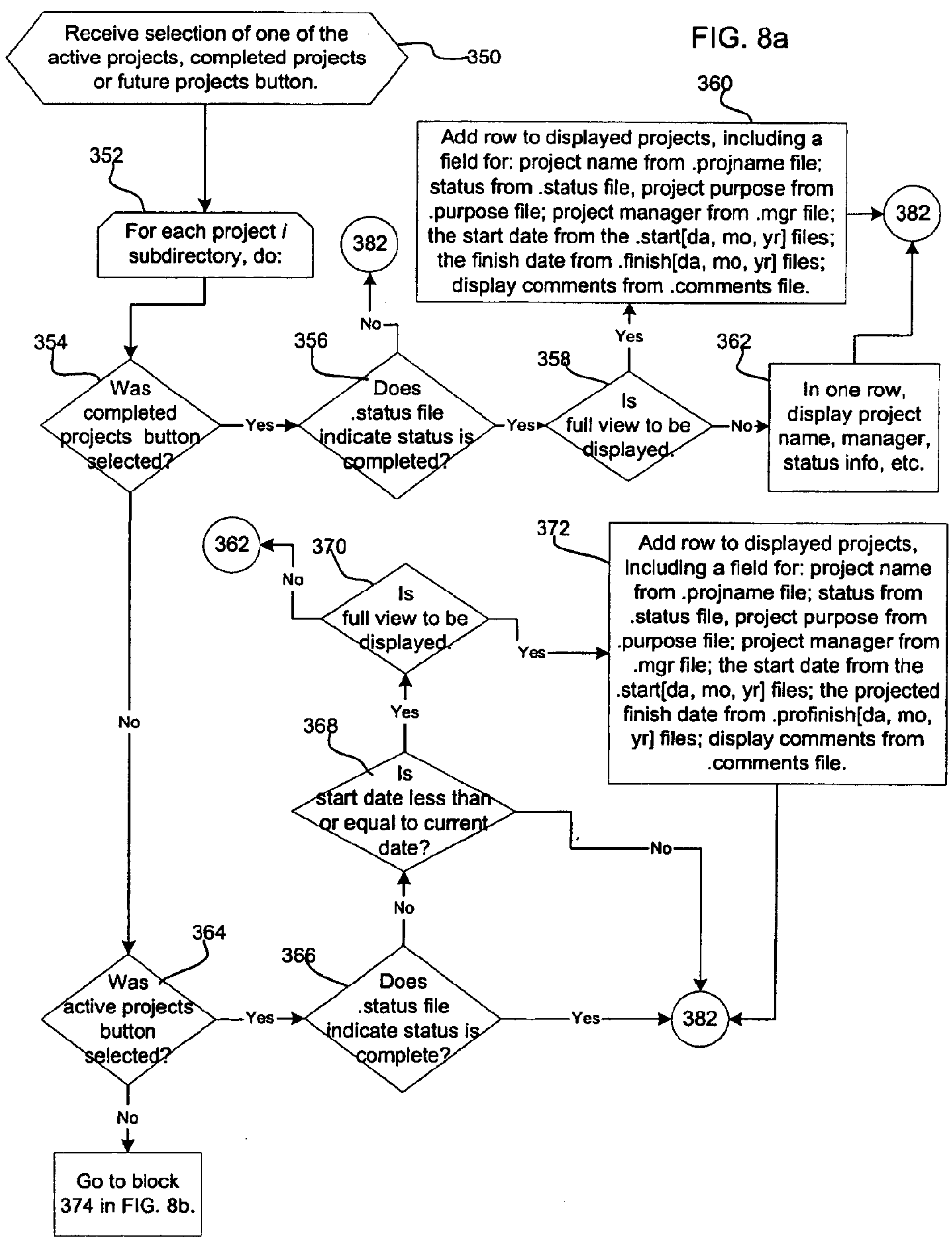
FIGS. 8*a* and 8*b* illustrate logic to display information on projects in the file management architecture of FIGS. 3*a, b* in accordance with certain implementations of the invention.
Figure 8B:
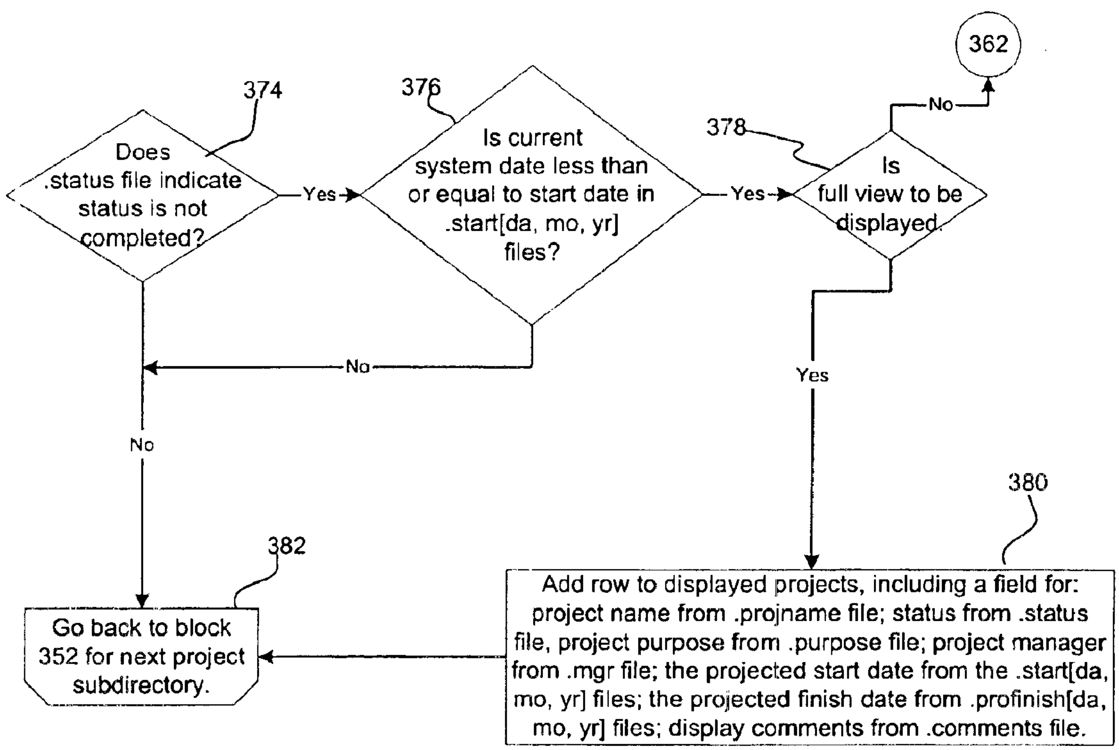
Figure 9:
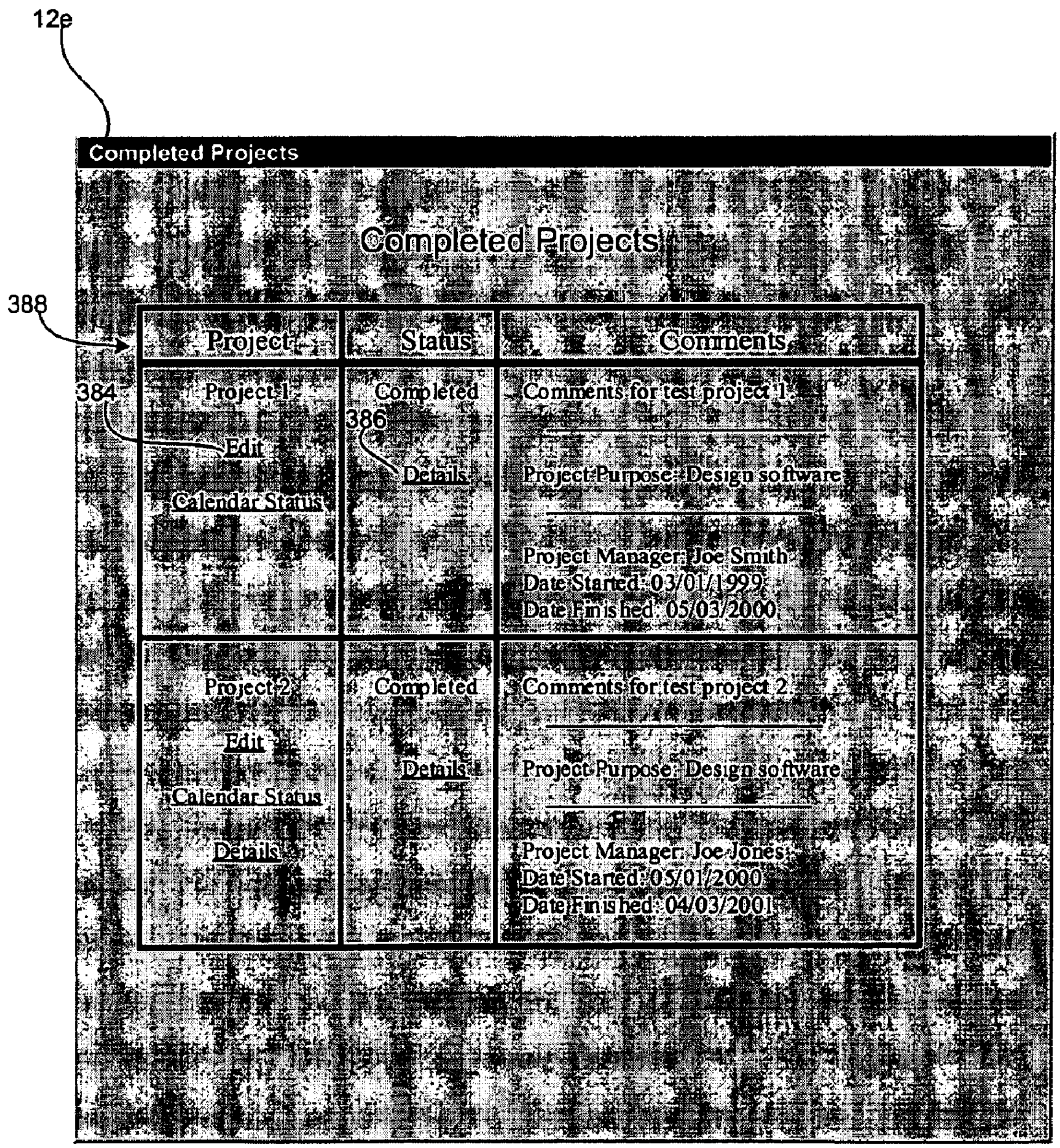
FIG. 9 illustrates a GUI panel displaying information generated according to the logic of FIGS. 8*a* and 8*b* in accordance with certain implementations of the invention.

FIGS. 8*a, b* illustrate logic implemented in the information server 8 program to generate pages to return to the user in response to selection of the active projects link 204, the completed projects link 206, or the future projects link 208 in FIG. 4. FIG. 9 illustrates an example of a page displaying information on projects in response to selection of one of the links 204, 206, or 208. With respect to FIGS. 8*a, b*, control begins at block 350 upon user selection of one of the links 204, 206, or 208. For each project i subdirectory, a loop is performed at blocks 352 through 382 in FIG. 8*b*. If (at block 354) the completed projects link 206 was selected and the status file 128*a, b* . . . *n* in subdirectory i indicates (at block 356) that the status is completed, then a determination is made (at block 358) as to whether the full view is selected to be displayed. The user may configure on a separate page the display attributes, such as whether full or partial information is displayed. If the full view is to be displayed, then the information server 8 adds (at block 360) a line to the displayed projects section of the displayed projects view page, and adds the one or more of the following attribute values from the attribute files in the subdirectory for project i to the added line in the displayed projects section: the project name from .projname file; status from .status file, project purpose from .purpose file; project manager from .mgr file; the start date from the .start[da, mo, yr] files; the finish date from .finish[da, mo, yr] files; and comments from .comments file.

If (at block 358) the full view option is not selected, then a single row of data is displayed, instead of multiple rows, including such information as the project name from the .projname file 114*a*, the manager name, start data, projected completion, percent completed, and status form other of the attribute files.

If (at block 364) the active projects link 204 (FIG. 4) is selected, then a determination is made if the project is complete. This determination is made by checking the status file. If (at block 366) the status is not complete and if (at block 368) the start date indicated in the start date files in the .start[da, mo, yr] attributes files 122*a* . . . *n*, 124*a* . . . *n*, 126*a* . . . *n* is less than or equal to the current date, then the project is active. If the project is active, then if (at block 370) the full view option is selected, then the information server 8 adds a row to display information on the active project. The information gathered from the attribute files 104*a* . . . *n* to 144*a* . . . *n* and displayed would be the same described with respect to block 360, except that the actual start date from the .startda, .startmo, and .startyr 122*a* . . . *n*, 124*a* . . . *n*, and 126*a* . . . *n* would be displayed, not a projected start date, and the projected completion date from the files .profinish[da, mo, yr] 108*a* . . . *n*, 110*a* . . . *n*, and 112*a* . . . *n* would be displayed instead of the actual finish date. If the project is not active, from the no branches of blocks 366 or 368, then control proceeds to block 382 to consider the next project.

If (from the no branch of block 364) the future projects link 208 (FIG. 4) was selected, then a determination is made as to whether the project is defined to start in the future. With respect to FIG. 8*b*, this determination is made by checking the .status file. If (at block 374) the status is not completed and if (at block 376) the start date is later than the current date, then the project will begin in the future. In such case, if the full view option is selected (at block 378), then the information server 8 generates into the page information from the attribute files 104*a* . . . *n* to 144*a* . . . *n* and the displayed data would be the same described with respect to block 360, except that the projected start date from the .startda, .startmo, and .startyr 122*a* . . . *n*, 124*a* . . . *n*, and 126*a* . . . .*n* would be displayed, not the actual start date, and the projected completion date from the files .profinish[da, mo, yr] 108*a* . . . *n*, 110*a* . . . *n*, and 112*a* . . . *n* would be displayed instead of the actual finish date.

FIG. 9 illustrates an example of the project display view 12*e* generated by the information server for completed projects. The table 388 includes the list of all the completed projects generated using the logic of FIGS. 8*a, b*. This view page 12*e* may be generated in response to user selection fo the completed projects link 206 (FIG. 4) Selection of the edit hypertext link 384 would cause the information server 8 to return a view page 12*a, b* . . . *n* including the attribute values pre-filled in the entry fields to enable the user to edit the attribute values for the project. The information gathered from the different attribute files for each completed project is displayed in the table 388. Selection of a details link 386 would display a details page 12*f* in which the user may enter information on tasks, interrupts, bugs or phases for a project.

Figure 3B:
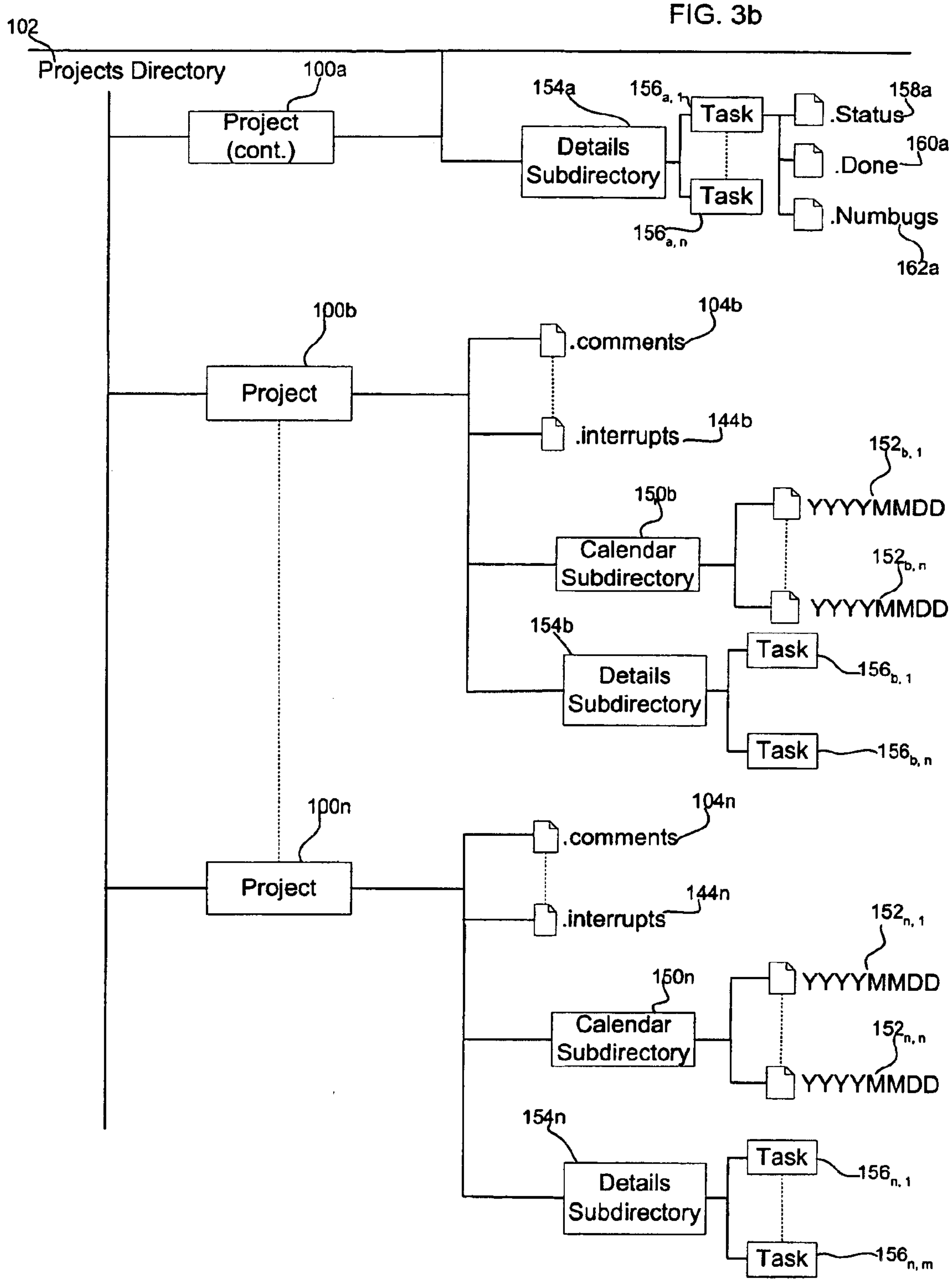
Figure 10:
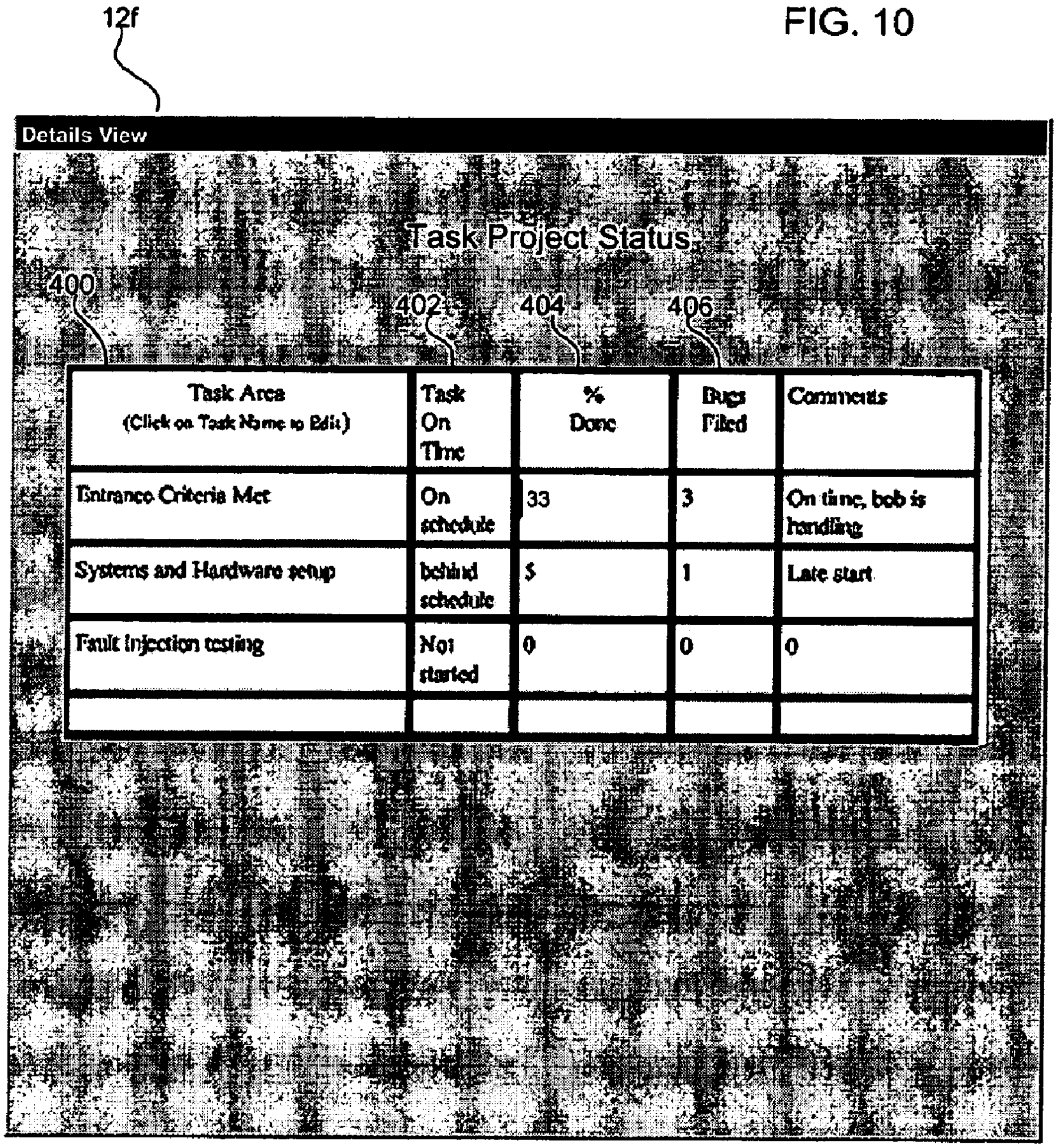
FIG. 10 illustrates a GUI panel displaying task information generated in accordance with certain implementations of the invention.

FIG. 10 illustrates an example of the details view 12*f* of a task project status displayed for an active project in response to the selection of a details link, such as the details link 386 in the projects table 12*e*. The task area column 400 displays the name of tasks defined for a project. As discussed, each separate task would comprise a subdirectory $\mathbf{156}_{a,1}$ . . . $\mathbf{156}_{a,n}$ (FIG. 3*b*) of the details subdirectory 154*a* of the project 100*a, b* . . . *n* for which the task is defined. The task on time column 402 indicates the current status of the task, which may be stored in the Status file 158*a* in the task subdirectory (FIG. 3*b*). The percentage of task completion shown in the third column 404 may also be stored in a separate file (160*a*) within the task subdirectories $\mathbf{156}_{a,1}$ . . . $\mathbf{156}_{a,n}$ as well as the .numbugs file 162*a*, which displays the number of bugs filed for a task in column 406. Additional columns of information may be provided in a task view for which there would be one or more files under the task subdirectory $\mathbf{156}_{a,1}$ . . . $\mathbf{156}_{a,n}$.

Figure 11:
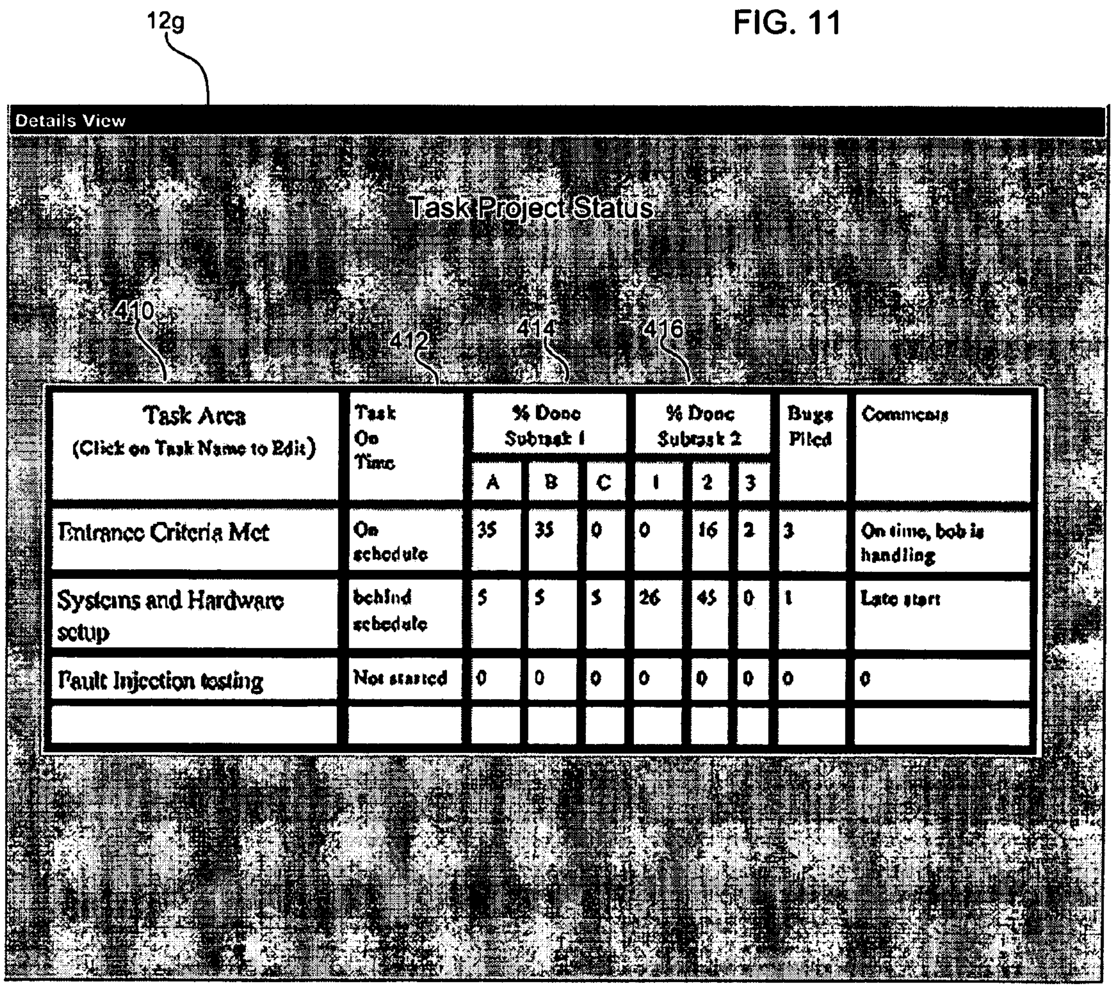
FIG. 11 illustrates a GUI panel displaying subtask information generated in accordance with certain implementations of the invention.

In still further implementations, each task may be comprised of subtasks having a separate percentage complete for each subtask. FIG. 11 illustrates an implementation of a projects table 12*g* where two of the tasks within the projects were defined to include subtasks. Each defined subtask 414 and 416 includes further subsections, shown as A, B, and C for subtask 414 and 1, 2, and 3 for subtask 416, in which the user may enter different percentage down amounts indicating the percentage completed of the different sections of a subtask. The data for each subtask could be stored in a separate directory of the task subdirectory $\mathbf{156}_{a,1}$ . . . $\mathbf{156}_{a,n}$, (FIG. 3*b*) where each subtask subdirectory would further include files for the attributes for a subtask, such as the percentage completed of different sections of the subtask.

In further implementations, in response to the user selecting the statistic/metric link 210 (FIG. 4), the information server 8 would search certain of the attribute files 104*a* . . . *n* to 144*a* . . . *n* and the .done file 160*a* for each project to gather metric and statistical data on certain attribute values on a project-by-project basis. The information may the be displayed in a metric view 12*h* shown in FIG. 12. For instance, information on the start and finish date displayed in column 420 may be obtained from the start 122*a*, 124*a*, 126*a* and the finish 134*a*, 136*a*, and 138*a* attribute files and information on the number of days a project was interrupted 422 and the type of interrupt 426, 428, 430 (holidays, days interrupted due to setup, and days interrupted due to management) would be obtained from the interrupts file 144*a* . . . *n* for each project. Further displayed is a percent completed 432 of the project which may be obtained from the .done 160*a* file. Information on the number of holidays could be obtain from the .holidays files 142*a* . . . *n*. Other displayed statistical information may be derived from data in the attribute files. For instance, the number of days an active project has been active, shown in column 424 of FIG. 12, may be determined by subtracting the start date from the current date, and then subtracting any holidays, interrupt days, and weekends. Such information on the status can be obtained from the .status attribute file 128*a* . . . *n* and the start related and finish related attribute files. The information displayed in the view 12*h* may further summarize information on a per task basis if multiple tasks are defined for a project. Such a breakdown would require further subcolumns in each type of delay 426, 428, 430 to provide the information for each task defined for a project.

As discussed, there may be additional subclasses of an information class. For instance, the calendar subclass of a project class provides a calendar view of a project. The calendar subdirectory 150*a* . . . *n* (FIGS. 3*a, b*) that stores the data for the project calendar includes one attribute file $\mathbf{152}_{a,1}$ . . . $\mathbf{152}_{a,n}$ for each day for which there is information to present. Each day attribute file for a calendar subdirectory includes information for a day. In certain implementations, whenever a user submits a page including a new interrupt added in the interrupts file 144*a* . . . *n* or a new bug added to the .bugtraqs file, then the information server 8 will append the information to the day file $\mathbf{152}_{a,1}$ . . . $\mathbf{152}_{a,n}$ for the day and affected project.

Figure 13:
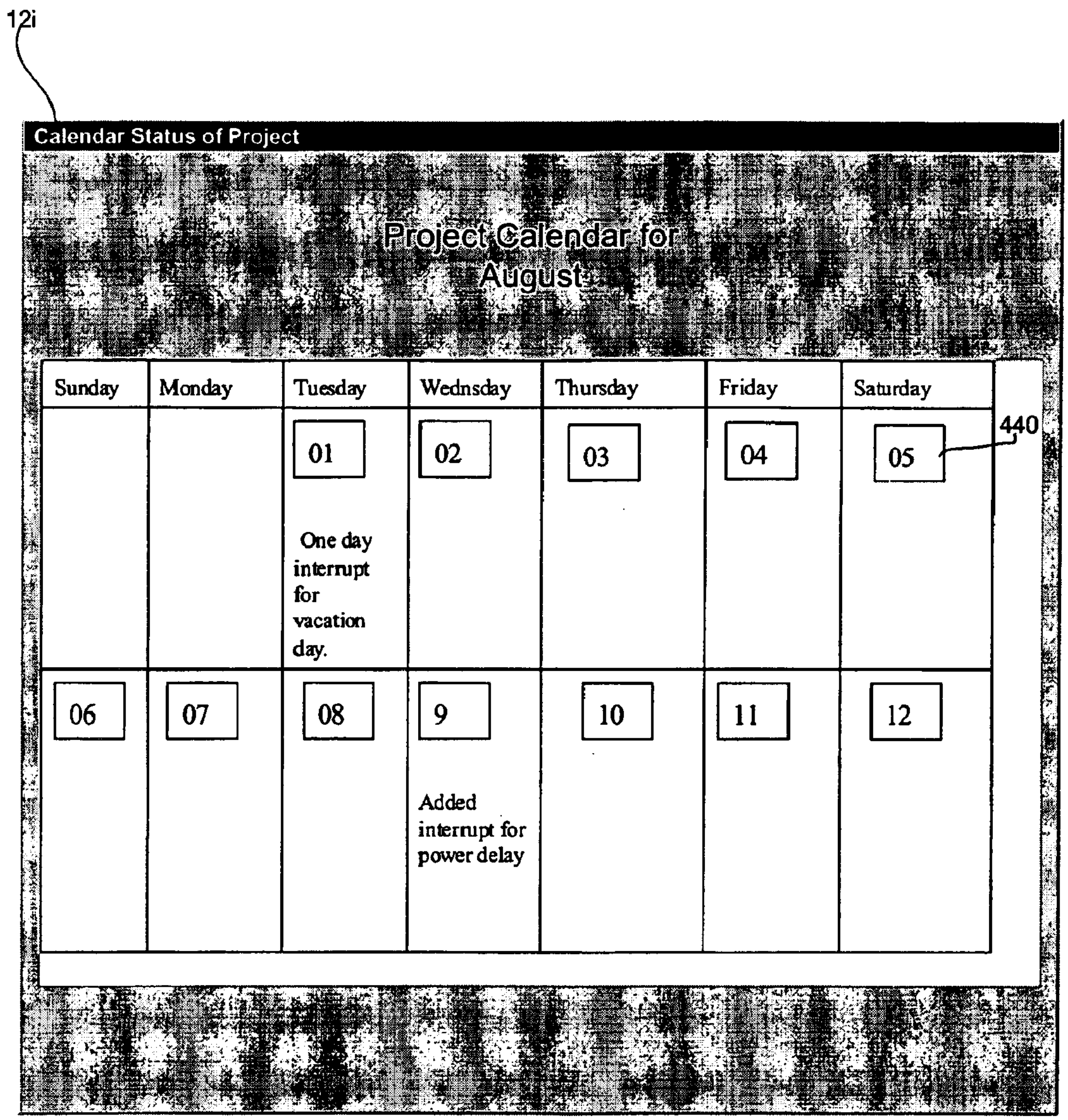
FIG. 13 illustrates a GUI panel displaying project calendar information in the file management architecture of FIGS. 3*a, b* in accordance with certain implementations of the invention.

FIG. 13 illustrates an example of a project calendar view 12*i*, where each day entry is either empty or includes the information added to the attribute file for that day in response to information being added to one of the project attribute files tracked by the calendar. For instance, if changes to the interrupts file 144*a* . . . *n* are made concerning a new interrupt, then such changes would be reflected in the day file $\mathbf{152}_{a,1}$ . . . $\mathbf{152}_{a,n}$ for the particular day on which the interrupt occurred. In response to a tracked attribute file being modified, the information server 8 would apply the updates to the tracked file to the calendar file for the effected day. Other files that may be tracked by the calendar include the .bugtraq file etc. Additionally, the user may directly enter information into the project calendar 440 by selecting a day and adding the information. In response, the information server 8 would add the user entered information into the day file $\mathbf{152}_{a,1}$ . . . $\mathbf{152}_{a,n}$ for the user selected day and project. If there is no day file $\mathbf{152}_{a,1}$ . . . $\mathbf{152}_{a,n}$ for the affected day, then the information server may create a new day file for the added information.

The described implementations concerned a file architecture for storing information used by an application program. In the file architecture, the application data is stored in separate files, and then accessed to allow a user to enter information or view the application data dispersed throughout different files.

The described file architecture may be implemented using standard file data structures and file management commands supplied by the operating system. The information server 8 would make file management command calls to access the data dispersed through the files in the file architecture.

The described implementations can implement a robust information management program without requiring the use of a database application program because the database and data management is implemented in the file system directories. This aspect makes the described architecture highly portable to other systems because applications written for different operating systems may include the same logic, but just use the calls for the target operating system. Because the basic file management operations are very similar for different operating systems, creating different versions of the information manager program for different operating systems would only require modifying the file management calls, which are often very similar in operation.

Additionally, the described implementations communicate with the users using an open document format compatible with the viewer programs users are likely to already have installed on their client systems 2*a, b . . . n*, e.g., web browsers. In such implementations, the users do not need to install any additional client programs on their machine because their viewer program is all that is needed. Implementing the system in this manner avoids the need to install special purpose database and interface software on both the clients and server because the described implementations exploit already existing installed viewer and network communication programs.

ADDITIONAL IMPLEMENTATION DETAILS

The described file management architecture may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the view pages 12*a, b . . . n* were implemented as HTML pages for display in a web browser type viewer. Additionally, the view pages 12*a, b . . . n* may be in alternative media formats, such as Extensible Markup Language (XML) pages, Standard Generalized Markup Language (SGML) file, ASCII, etc. The described implementations utilize a browser program, such as a web browser capable of rendering HTML and other markup language content. However, any presentation program capable of rendering content in any media format may be used to render the state changes supplied by the server.

In the described implementations, the client and server used the HTTP protocol to communicate. In alternative implementations, the client and server may use any communication or messaging protocol known in the art to communicate.

The described implementations include one class type whose files are stored in a subdirectory of the main directory and one subclass for each class type, implemented as a subdirectory of the information class subdirectory. Additional information class types may be added at the same level providing different types of information and additional attribute files may be provided to store the values associated with the additional information classes.

The preferred logic of FIGS. 7 and 8*a, b* describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing information for an application program, wherein the information includes an information class having a plurality of attributes values, wherein the application program maintains multiple information class instances and wherein each instance includes at least one of the plurality of attribute values, comprising:

receiving user input indicating a plurality of information class instances and for each information class instance at least one attribute value;

generating a main directory for the application program;

for each information class instance received from the user, performing:

(i) generating a subdirectory from the main directory for the information class instance;

(ii) for each received attribute value for the information class instance, generating one attribute file providing the at least one attribute value; and (iii) storing each generated attribute file in the subdirectory of the information class instance for which the attribute value is provided.

2. The method of claim 1, further comprising:

receiving a request for information on at least one requested attribute value for the information class instances; and in response to the request for information, performing for each information class instance:

(i) accessing the subdirectory for the information class instance;

(ii) determining whether the accessed subdirectory includes each requested attribute value in one attribute file in the subdirectory; and (iii) if the subdirectory includes each requested attribute value in one attribute file, then returning each requested attribute value from the attribute file.

3. The method of claim 2, wherein the request for information further includes a criteria to apply to at least one of the requested attribute values, further comprising:

determining whether the requested attribute value in the attribute file to which the criteria applies satisfies the criteria, wherein the attribute values for one information class instance are not returned if the criteria for one attribute value of the information class instance is not satisfied.

4. The method of claim 2, wherein the subdirectory does not include one attribute value if there is no attribute file for the attribute value.

5. The method of claim 2, wherein returning the attribute value further comprises:

generating the requested attribute values into a form, wherein the form includes information on attribute values in attribute files in multiple subdirectories for information class instances, and wherein the form is returned.

6. The method of claim 5, wherein the form is implemented in a standard document format capable of being rendered by a viewer program used to render documents retrieved from over a network.

7. The method of claim 6, wherein the form is implemented as one of a HyperText Markup Language file or Extensible Markup Language (XML) file and the viewer program comprises an Internet browser program.

8. The method of claim 1, wherein at least one attribute file provides the attribute value by embedding the attribute value in a file name of the attribute file.

9. The method of claim 1, wherein at least one attribute file provides the attribute value by inserting the attribute value within the attribute file.

10. The method of claim 1, wherein at least one attribute value is comprised of multiple component values.

11. The method of claim 10, wherein each of the multiple component values is capable of being comprised of a plurality of multiple sub-component values.

12. The method of claim 1, wherein the information class comprises a first information class and wherein a second information class is a subclass of the first information class and has at least one attribute value, wherein there is one instance of the second information class for each instance of the first information class, further performing for each instance of the first information class:

generating a subdirectory for the second information class in the subdirectory generated for the first information class.

13. The method of claim 12, further comprising:

receiving user input for one attribute value for the second information class; and generating one attribute file for the received user input in the subdirectory for the second information class, wherein the attribute file provides the received attribute value.

14. The method of claim 12, wherein the attribute value for the second information class for which the attribute file was generated includes at least one attribute value from the first information class.

15. The method of claim 1, further comprising:

receiving a request for statistical information on requested attribute values;

for each information class instance, performing:

(i) reading the attribute files for the requested attribute values to generate information summarizing the attribute values;

(ii) and returning the information summarizing the attribute values.

16. A method for managing information on a plurality of projects, wherein each project is capable of having a plurality of attribute values, comprising:

receiving user input on a plurality of projects and for each project at least one attribute value;

generating a main directory;

for each project for which user input is received, performing:

(i) generating a subdirectory from the main directory for the project; and (ii) for each received attribute value, generating one attribute file providing the at least one attribute value;

receiving user input for at least one task for one project;

for each task for which user input is received, generating a task subdirectory in the subdirectory for the project including the task; and for each received attribute value providing information on the task, generating at least one attribute file indicating each received attribute value.

17. The method of claim 16, wherein the attribute values for each project are capable of comprising one or more of the following project attribute values: project comments, a project manager, projected completion date, project purpose, project start date, project actual completion date, project status, project holidays, and project interrupts.

18. The method of claim 17, wherein the project interrupts attribute value in the project interrupt file is comprised of multiple interrupt components, wherein each interrupt component includes subcomponents indicating a type of interrupt, date of interrupt, duration of interrupt, and interrupt comments.

19. The method of claim 16, further comprising:

receiving a request for information on at least one requested attribute value for the project; and in response to the request for information, performing for each project subdirectory;

(i) accessing the project subdirectory;

(ii) determining whether the accessed project subdirectory includes each requested attribute value in one attribute file in the subdirectory;

(iii) if the subdirectory includes each requested attribute value in one attribute file, then returning each requested attribute value from the attribute file.

20. The method of claim 19, wherein the request for information further includes a criteria to apply to the requested attribute values, wherein the criteria specifies a status of the project, further comprising:

determining whether the requested attribute value in the attribute file to which the criteria applies satisfies the criteria, wherein the attribute values for one project subdirectory are not returned if the criteria for one attribute value is not satisfied.

21. The method of claim 16, further comprising:

generating a calendar subdirectory for each project subdirectory, wherein the calendar subdirectory includes one calendar file for each day for which calendar information is provided for the project.

22. The method of claim 21, wherein the calendar information for one day and one project is entered by a user.

23. method of claim 21, wherein the calendar information entered into one calendar file for one project comprises one attribute value received from the user for the project that is also entered into one attribute file in the project subdirectory.

24. The method of claim 16, further comprising:

receiving user input for one task indicating a number of subtasks;

receiving user input indicating a percent completion for each subtask of the task; and for each received percent completion for one subtask, generating at least one attribute file indicating the percent completion of the subtask.

25. A system for managing information for an application program, wherein the information includes an information class having a plurality of attributes values, wherein the application program maintains multiple information class instances and wherein each instance includes at least one of the plurality of attribute values, comprising:

means for receiving user input indicating a plurality of information class instances and for each information class instance at least one attribute value;

means for generating a main directory for the application program;

means for performing, for each information class instance received from the user:

(i) generating a subdirectory from the main directory for the information class instance;

(ii) for each received attribute value for the information class instance, generating one attribute file providing the at least one attribute value; and (iii) storing each generated attribute file in the subdirectory of the information class instance for which the attribute value is provided.

26. The system of claim 25, further comprising:

means for receiving a request for information on at least one requested attribute value for the information class instances; and means for performing, in response to the request for information, for each information class instance:

(i) accessing the subdirectory for the information class instance;

(ii) determining whether the accessed subdirectory includes each requested attribute value in one attribute file in the subdirectory; and (iii) if the subdirectory includes each requested attribute value in one attribute file, then returning each requested attribute value from the attribute file.

27. The system of claim 26, wherein the request for information further includes a criteria to apply to at least one of the requested attribute values, further comprising:

means for determining whether the requested attribute value in the attribute file to which the criteria applies satisfies the criteria, wherein the attribute values for one information class instance are not returned if the criteria for one attribute value of the information class instance is not satisfied.

28. The system of claim 26, wherein the means for returning the attribute value further performs:

generating the requested attribute values into a form, wherein the form includes information on attribute values in attribute files in multiple subdirectories for information class instances, and wherein the form is returned.

29. The system of claim 25, wherein the information class comprises a first information class and wherein a second information class is a subclass of the first information class and has at least one attribute value, wherein there is one instance of the second information class for each instance of the first information class, wherein the means for performing for each instance of the first information class further performs:

generating a subdirectory for the second information class in the subdirectory generated for the first information class.

30. A system for managing information on a plurality of projects, wherein each project is capable of having a plurality of attribute values, comprising:

means for receiving user input on a plurality of projects and for each project at least one attribute value;

means for generating a main directory;

means for performing for each project for which user input is received:

(i) generating a subdirectory from the main directory for the project; and (ii) for each received attribute value, generating one attribute file providing the at least one attribute value;

means for receiving user input for at least one task for one project;

means for generating, for each task for which user input is received, a task subdirectory in the subdirectory for the project including the task; and means for generating, for each received attribute value providing information on the task, at least one attribute file indicating each received attribute value.

31. The system of claim 30, wherein the attribute values for each project are capable of comprising one or more of the following project attribute values: project comments, a project manager, projected completion date, project purpose, project start date, project actual completion date, project status, project holidays, and project interrupts.

32. The system of claim 31, wherein the project interrupts attribute value in the project interrupt file is comprised of multiple interrupt components, wherein each interrupt component includes subcomponents indicating a type of interrupt, date of interrupt, duration of interrupt, and interrupt comments.

33. The system of claim 30, further comprising:

means for receiving a request for information on at least one requested attribute value for the project; and means for performing, for each project subdirectory, in response to the request for information:

(i) accessing the project subdirectory;

(ii) determining whether the accessed project subdirectory includes each requested attribute value in one attribute file in the subdirectory;

(iii) if the subdirectory includes each requested attribute value in one attribute file, then returning each requested attribute value from the attribute file.

34. The system of claim 30, further comprising:

means for generating a calendar subdirectory for each project subdirectory, wherein the calendar subdirectory includes one calendar file for each day for which calendar information is provided for the project.

35. The system of claim 30, further comprising:

means for receiving user input for one task indicating a number of subtasks;

means for receiving user input indicating a percent completion for each subtask of the task; and means for generating, for each received percent completion for one subtask, at least one attribute file indicating the percent completion of the subtask.

36. An article of manufacture including code for managing information for an application program, wherein the information includes an information class having a plurality of attributes values, wherein the application program maintains multiple information class instances and wherein each instance includes at least one of the plurality of attribute values, wherein the code causes operations to be performed comprising:

receiving user input indicating a plurality of information class instances and for each information class instance at least one attribute value;

generating a main directory for the application program;

for each information class instance received from the user, performing:

(i) generating a subdirectory from the main directory for the information class instance;

(ii) for each received attribute value for the information class instance, generating one attribute file providing the at least one attribute value; and (iii) storing each generated attribute file in the subdirectory of the information class instance for which the attribute value is provided.

37. The article of manufacture of claim 36, further comprising:

receiving a request for information on at least one requested attribute value for the information class instances; and in response to the request for information, performing for each information class instance:

(i) accessing the subdirectory for the information class instance;

(ii) determining whether the accessed subdirectory includes each requested attribute value in one attribute file in the subdirectory; and (iii) if the subdirectory includes each requested attribute value in one attribute file, then returning each requested attribute value from the attribute file.

38. The article of manufacture of claim 37, wherein the request for information further includes a criteria to apply to at least one of the requested attribute values, further comprising:

determining whether the requested attribute value in the attribute file to which the criteria applies satisfies the criteria, wherein the attribute values for one information class instance are not returned if the criteria for one attribute value of the information class instance is not satisfied.

39. The article of manufacture of claim 37, wherein the subdirectory does not include one attribute value if there is no attribute file for the attribute value.

40. The article of manufacture of claim 37, wherein returning the attribute value further comprises:

generating the requested attribute values into a form, wherein the form includes information on attribute values in attribute files in multiple subdirectories for information class instances, and wherein the form is returned.

41. The article of manufacture of claim 40, wherein the form is implemented in a standard document format capable of being rendered by a viewer program used to render documents retrieved from over a network.

42. The article of manufacture of claim 41, wherein the form is implemented as one of a HyperText Markup Language file or Extensible Markup Language (XML) file and the viewer program comprises an Internet browser program.

43. The article of manufacture of claim 36, wherein at least one attribute file provides the attribute value by embedding the attribute value in a file name of the attribute file.

44. The article of manufacture of claim 36, wherein at least one attribute file provides the attribute value by inserting the attribute value within the attribute file.

45. The article of manufacture of claim 36, wherein at least one attribute value is comprised of multiple component values.

46. The article of manufacture of claim 36, wherein each of the multiple component values is capable of being comprised of a plurality of multiple sub-component values.

47. The article of manufacture of claim 36, wherein the information class comprises a first information class and wherein a second information class is a subclass of the first information class and has at least one attribute value, wherein there is one instance of the second information class for each instance of the first information class, further performing for each instance of the first information class:

generating a subdirectory for the second information class in the subdirectory generated for the first information class.

48. The article of manufacture of claim 47, further comprising:

receiving user input for one attribute value for the second information class; and generating one attribute file for the received user input in the subdirectory for the second information class, wherein the attribute file provides the received attribute value.

49. The article of manufacture of claim 47, wherein the attribute value for the second information class for which the attribute file was generated includes at least one attribute value from the first information class.

50. The article of manufacture of claim 36, further comprising:

receiving a request for statistical information on requested attribute values;

for each information class instance, performing:

(i) reading the attribute files for the requested attribute values to generate information summarizing the attribute values;

(ii) and returning the information summarizing the attribute values.

51. An article of manufacture including code for managing information on a plurality of projects, wherein each project is capable of having a plurality of attribute values, wherein the code causes operations to be performed comprising:

receiving user input on a plurality of projects and for each project at least one attribute value;

generating a main directory;

for each project for which user input is received, performing:

(i) generating a subdirectory from the main directory for the project; and (ii) for each received attribute value, generating one attribute file providing the at least one attribute value;

receiving user input for at least one task for one project;

for each task for which user input is received, generating a task subdirectory in the subdirectory for the project including the task; and for each received attribute value providing information on the task, generating at least one attribute file indicating each received attribute value.

52. The article of manufacture of claim 51, wherein the attribute values for each project are capable of comprising one or more of the following project attribute values: project comments, a project manager, projected completion date, project purpose, project start date, project actual completion date, project status, project holidays, and project interrupts.

53. The article of manufacture of claim 52, wherein the project interrupts attribute value in the project interrupt file is comprised of multiple interrupt components, wherein each interrupt component includes subcomponents indicating a type of interrupt, date of interrupt, duration of interrupt, and interrupt comments.

54. The article of manufacture of claim 51, further comprising:

receiving a request for information on at least one requested attribute value for the project; and in response to the request for information, performing for each project subdirectory;

(i) accessing the project subdirectory;

(ii) determining whether the accessed project subdirectory includes each requested attribute value in one attribute file in the subdirectory;

(iii) if the subdirectory includes each requested attribute value in one attribute file, then returning each requested attribute value from the attribute file.

55. The article of manufacture of claim 54, wherein the request for information further includes a criteria to apply to the requested attribute values, wherein the criteria specifies a status of the project, further comprising:

determining whether the requested attribute value in the attribute file to which the criteria applies satisfies the criteria, wherein the attribute values for one project subdirectory are not returned if the criteria for one attribute value is not satisfied.

56. The article of manufacture of claim 51, further comprising:

generating a calendar subdirectory for each project subdirectory, wherein the calendar subdirectory includes one calendar file for each day for which calendar information is provided for the project.

57. The article of manufacture of claim 56, wherein the calendar information for one day and one project is entered by a user.

58. The article of manufacture of claim 56, wherein the calendar information entered into one calendar file for one project comprises one attribute value received from the user for the project that is also entered into one attribute file in the project subdirectory.

59. The article of manufacture of claim 51, further comprising:

receiving user input for one task indicating a number of subtasks;

receiving user input indicating a percent completion for each subtask of the task; and for each received percent completion for one subtask, generating at least one attribute file indicating the percent completion of the subtask.

60. A computer readable medium including information for an application program, wherein the information includes an information class having a plurality of attributes values, wherein the application program maintains multiple information class instances and wherein each instance includes at least one of the plurality of attribute values, comprising:

a main file directory for the application program;

one subdirectory from the main directory for each information class instance; and one attribute file for each attribute value for each information class instance, wherein each attribute file provides one attribute value and is in the subdirectory of the information class instance for which the attribute value is provided.

61. The computer readable medium of claim 60, wherein at least one attribute file provides the attribute value by embedding the attribute value in a file name of the attribute file.

62. The computer readable medium of claim 60, wherein at least one attribute file provides the attribute value by inserting the attribute value within the attribute file.

63. The computer readable medium of claim 60, wherein the information class comprises a first information class and wherein a second information class is a subclass of the first information class and has at least one attribute value, wherein there is one instance of the second information class for each instance of the first information class, further comprising:

a subdirectory for the second information class for each first information class in the subdirectory generated for the first information class.

64. A computer readable medium including information on a plurality of projects, wherein each project is capable of having a plurality of attribute values, comprising:

a main directory;

a subdirectory from the main directory for the project;

one attribute file for each attribute value providing the at least one attribute value;

a task subdirectory in the subdirectory for the project including each task for which user input is received; and one attribute file indicating a received attribute value for each received attribute value providing information on the task.

65. The computer readable medium of claim 64, wherein the attribute values for each project are capable of comprising one or more of the following project attribute values: project comments, a project manager, projected completion date, project purpose, project start date, project actual completion date, project status, project holidays, and project interrupts.

66. The computer readable medium of claim 64, further comprising:

a calendar subdirectory for each project subdirectory, wherein the calendar subdirectory includes one calendar file for each day for which calendar information is provided for the project.

* * * * *